US012551995B2

United States Patent
(12) United States Patent

O'Brien et al.

(10) Patent No.: US 12,551,995 B2

(45) Date of Patent: Feb. 17, 2026

(54) HYDRAULIC TORQUE WRENCH

(71) Applicant: ATLAS COPCO INDUSTRIAL TECHNIQUE AB, Stockholm (SE)

(72) Inventors: Ian O'Brien, Cramlington (GB); Joseph Gill, Cramlington (GB); Tony Dodds, Cramlington (GB); Teresa O'Brien, Cramlington (GB)

(73) Assignee: Atlas Copco Industrial Technique AB (SE)

( * ) Notice: Subject to any disclaimer, the term of this patent is extended or adjusted under 35 U.S.C. 154(b) by 0 days.

(21) Appl. No.: 18/720,136

(22) PCT Filed: Dec. 14, 2022

(86) PCT No.: PCT/IB2022/062229

§ 371 (c)(1), (2) Date: Jun. 14, 2024

(87) PCT Pub. No.: WO2023/111904

PCT Pub. Date: Jun. 22, 2023

(65) Prior Publication Data

US 2024/0416491 A1 Dec. 19, 2024

(30) Foreign Application Priority Data

Dec. 15, 2021 (GB) ..................................... 2118146

(51) Int. Cl.

*B25B 23/145* (2006.01)
*B25B 21/00* (2006.01)
*B25B 23/00* (2006.01)

(52) U.S. Cl.

CPC .......... *B25B 23/145* (2013.01); *B25B 21/005* (2013.01); *B25B 23/0035* (2013.01)

(58) Field of Classification Search

CPC .. B25B 23/145; B25B 23/0035; B25B 21/005
See application file for complete search history.

(56) References Cited

U.S. PATENT DOCUMENTS

| | | | | |
|---|---|---|---|---|
| 5,140,874 A | | 8/1992 | Junkers | |
| 10,655,683 B2 | * | 5/2020 | Gregorio | B25B 23/0035 |
| 2006/0053981 A1 | * | 3/2006 | Shaw | B25B 23/0078 81/57.39 |

FOREIGN PATENT DOCUMENTS

| | | |
|---|---|---|
| GB | 2524825 A | 10/2015 |
| GB | 2573728 A | 11/2019 |

(Continued)

OTHER PUBLICATIONS

International Search Report and Written Opinion for International Application No. PCT/IB2022/062229 mailed on Mar. 16, 2023 in 11 pages.
Search Report for GB 2118146.6, searched Jun. 9, 2022.
US, PCT/IB2022/062228, Dec. 14, 2022, Hydraulic Torque Wrench.

(Continued)

*Primary Examiner* — Nathaniel C Chukwurah

(74) *Attorney, Agent, or Firm* — Knobbe Martens Olson & Bear, LLP

(57) ABSTRACT

A hydraulic torque wrench (10), comprising: an input, for pressurised hydraulic fluid; a drive connector (14); a drive connector (13), driven by hydraulic fluid introduced at the input and arranged to drive the drive connector (14) to rotate; a drive member (1) for connecting to an item to be rotated by the hydraulic torque wrench (10), the drive member (1) comprising: a drive member (16), which engages the drive connector (14) so as to be driven by the drive connector (14) and a second part (18) arranged to be coupled to the item to be rotated. In which the drive member (1) comprises a retention mechanism which has two states: a first state, in which it prevents removal of the drive member (1) from the drive connector (14); and, a second, state in which it permits removal of the drive member (1) from the drive connector (14). In which the retention mechanism remains connected to the drive member (1) in the first state and in the second state. In which the retention mechanism comprises at least one retractable pin in the drive (Continued)

member (1), the retractable pin extending from the drive member (1) into the drive connector (14) in the first state and retracting into the drive member (1) in the second state. In which the drive member (16) of the drive member (1) has splines (15), and the drive connector (14) has splines (15) complementary to those of the drive member (16) of the drive member (1). In which each pin protrudes from the splines (15) of the drive member (1). There is no need to remove a separate retention member to change the drive member (16).

20 Claims, 3 Drawing Sheets

(56) References Cited

FOREIGN PATENT DOCUMENTS

| | | |
|---|---|---|
| WO | WO 2015/021197 A1 | 2/2015 |
| WO | WO 2018/130854 A1 | 7/2018 |
| WO | WO 2023/111903 | 6/2023 |
| WO | WO 2023/111905 | 6/2023 |
| WO | WO 2023/111906 | 6/2023 |

OTHER PUBLICATIONS

US, PCT/IB2022/062229, Dec. 14, 2022, Hydraulic Torque Wrench.
US, PCT/IB2022/062230, Dec. 14, 2022, Hydraulic Torque Wrench.
US, PCT/IB2022/062231, Dec. 14, 2022, Drive Assembly for a Torque Wrench.

* cited by examiner

HYDRAULIC TORQUE WRENCH

PRIORITY CLAIM AND INCORPORATION BY REFERENCE

This application is the United States National Phase, pursuant to 35 U.S.C. § 371, of International Patent Application No. PCT/IB2022/062229, filed Dec. 14, 2022, which claims the benefit of and priority to Great Britain Application No. 2118146.6, filed Dec. 15, 2021. The entire content of each of these applications is herein incorporated in its entirety by reference. This invention relates to a hydraulic torque wrench.

Torque wrenches, such as hydraulic torque wrenches, are well known in the prior art and widely used where a torque is to be applied, e.g. to a nut, bolt, or other fastener.

Some hydraulic torque wrenches, such as that disclosed in WO2018/130854, comprise a head containing a drive mechanism driven by hydraulic fluid which drives an item to be rotated.

Atlas Copco provides a hydraulic torque wrench, as do other suppliers, which comprise a releasable drive (typically a square drive, although a differently-shaped drive, e.g. a hexagon drive or a socket drive, may be used). One or more drive sleeves may be used to assist with insertion and/or positioning of the drive. One or more releasable retainers may be used to retain the drive.

In order to reverse the direction of rotation, it is necessary to remove the square drive component and position it on the opposite side of the tool. When changing the drive direction, the operator must handle multiple components simultaneously, in particular the wrench, square drive (and socket), and one or more retainers. A retainer can easily be dropped and lost, potentially rendering the tool dangerous or unusable, and other components may end up misaligned.

We are aware of attempts to solve this problem, such as those suggested in WO2015/021197, but these sacrifice significant amounts of the area that is used for torque transfer to the drive for the sake of locking the tool. As such, in order to transfer the same amount of torque, a bigger drive is required, making the tool unnecessarily bulky.

According to a first aspect of the invention, we provide a hydraulic torque wrench, comprising:

- an input for pressurised hydraulic fluid;
- a drive connector;
- a drive mechanism driven by hydraulic fluid introduced at the input and arranged to drive the drive connector to rotate;
- a drive member for connecting to an item to be rotated by the hydraulic torque wrench, the drive member comprising a first part which engages the drive connector so as to be driven by the drive connector and a second part arranged to be coupled to the item to be rotated;
- in which the drive member comprises a retention mechanism which has two states; a first state in which it prevents removal of the drive member from the drive connector and a second state in which it permits removal of the drive member from the drive connector, and in which the retention mechanism remains connected to the drive member in the first state and in the second state.

As such, this provides a hydraulic torque wrench where in order to change the drive member, there is no need to remove a separate retention member. As such, there are only two loose items that require handling by a user, making the procedure of changing the drive member much easier. The user is less likely to drop one item than two loose items.

The retention mechanism may comprise at least one retractable pin in the drive member, typically in the first part thereof, the retractable pin extending from the drive member into the drive connector in the first state and retracting into the drive member in the second state.

The first part of the drive member may have splines, and the drive connector may have splines complementary to those of the first part of the drive member; as such, the first part of the drive member may engage the drive connector through a splined connection. The pins may protrude from the splines of the drive member. In particular, where the splines of the drive member and of the drive connector comprise ridges separated by grooves, each pin may protrude from the grooves, so as to engage a ridge of the drive connector. Thus, this allows a greater proportion of the connection to be splined, allowing for a more reliable transfer of torque, than if a specific length of the engagement of the first part in the head were used to lock the drive member in place.

The splines of the drive connector may be in a bore.

The first part of the drive member may comprise an internal bore, typically cylindrical. Each pin may work in a pin bore in the drive member in communication with the internal bore, such that more of each pin protrudes into the internal bore in the second state than in the first state. There may be a spring in each pin bore which tends to bias each pin into the second state.

The first part of the drive member may comprise an eccentric cam member which can rotate in the internal bore coaxially with the internal bore and having a radius, the cam member having at least one wider part and at least one narrower part, with each wider part having a larger radius than each narrower part, and in which in the first state one wider part engages each pin and forces the pin along the pin bore and in the second state a narrower part engages each pin. Typically, the cam member may be elliptical, with the wider parts being along the major axis of the ellipse and the narrower parts being along the minor axis.

Each narrower portion may be provided with a recess for a pin; as such, this may provide positive feedback to a user that the narrower part is engaging the pin.

The first part of the drive member may further be provided with a locking mechanism, which will only allow a transition from the first state to the second state when unlocked. As such, the locking mechanism may comprise a button member which can slide in the internal bore and which is fixed relative to the cam member. The button member may be provided with at least one protrusion each of which works in two connected slots in the internal bore: an axial slot along a length of the internal bore, and a circumferential slot around the internal circumference of the internal bore.

Thus, when each protrusion is in an axial slot, the button member may move axially along the internal bore, but cannot rotate; typically, this would correspond with each wider portion of the cam member engaging each pin. As such, the cam member cannot be rotated, and the first part is locked in the first state.

However, if the button member is pushed so that each protrusion reaches a circumferential slot, the button member can then be rotated. The cam member will then also rotate, allowing each narrower portion to engage each pin and so allow the first part to enter the second state.

The locking mechanism may comprise a spring arranged to bias the button member axially away from each circumferential slot.

The second part may comprise a square, hexagonal or other drive for the item to be rotated.

There now follows, by way of example only, description of an embodiment of the invention, described with reference to the accompanying drawings, in which.

Figure 1:
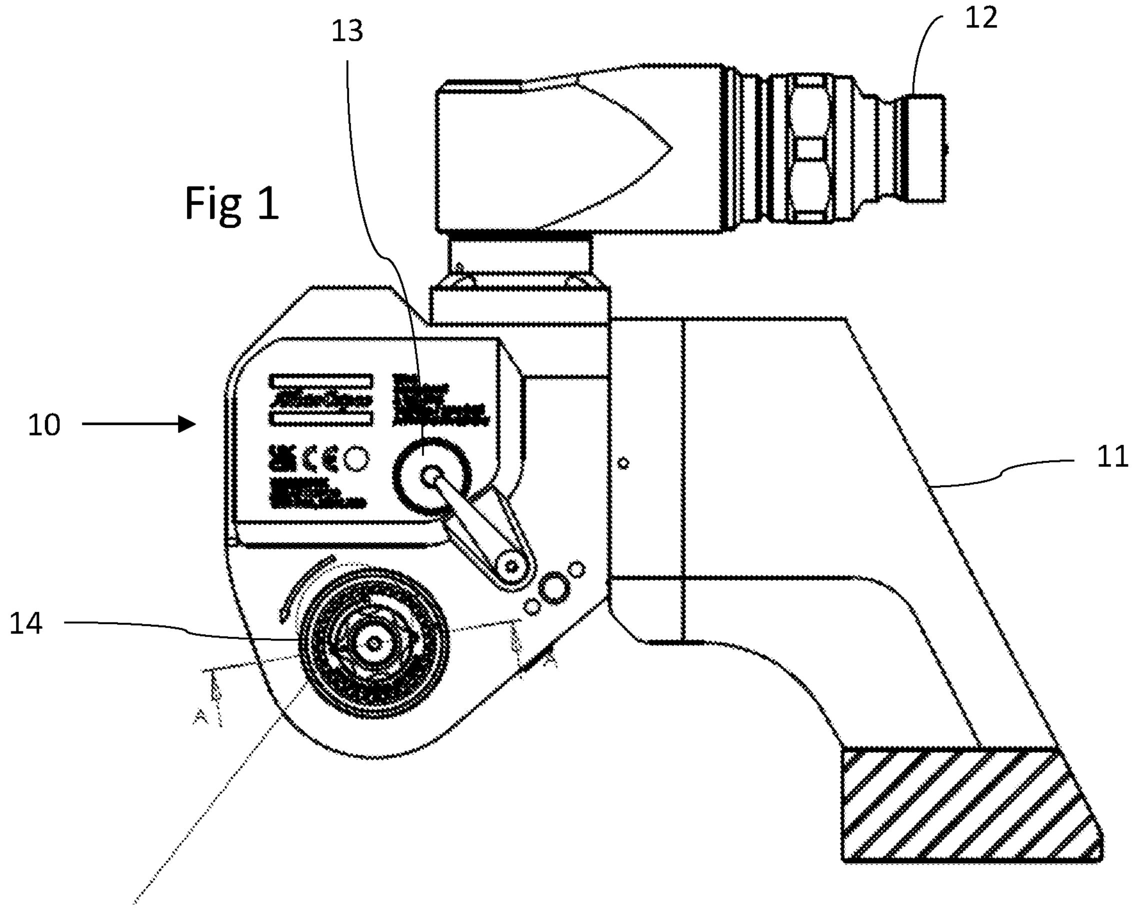
FIG. 1 shows a side elevation of a hydraulic torque wrench in accordance with an embodiment of the invention.
Figure 2:
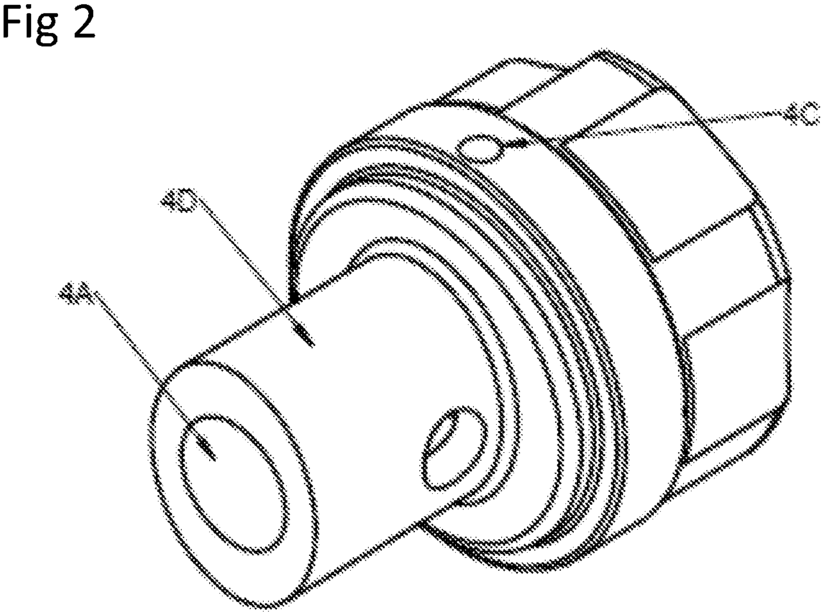
FIG. 2 shows a perspective view of the locking button of FIG. 1.

A hydraulic torque wrench 10 is shown in the accompanying drawings. The wrench 10 comprises a head 11, which has a port 12 for hydraulic fluid. The head 11 contains a drive mechanism (largely internal, but indicated at 13) which uses the pressure of pressurised hydraulic fluid at port 12 to rotate a drive member 1 of the form of a square drive which is discussed in more detail below. This is then connected to an item to be rotated (e.g. a nut, via a socket).

The drive member 1 is connected to the head 11 through a drive connector 14 on the head 11. This can be seen in more detail in FIG. 6 of the accompanying drawings, and comprises a bore 21 having internal splines 15 running along the length of the bore 21.

Figure 6:
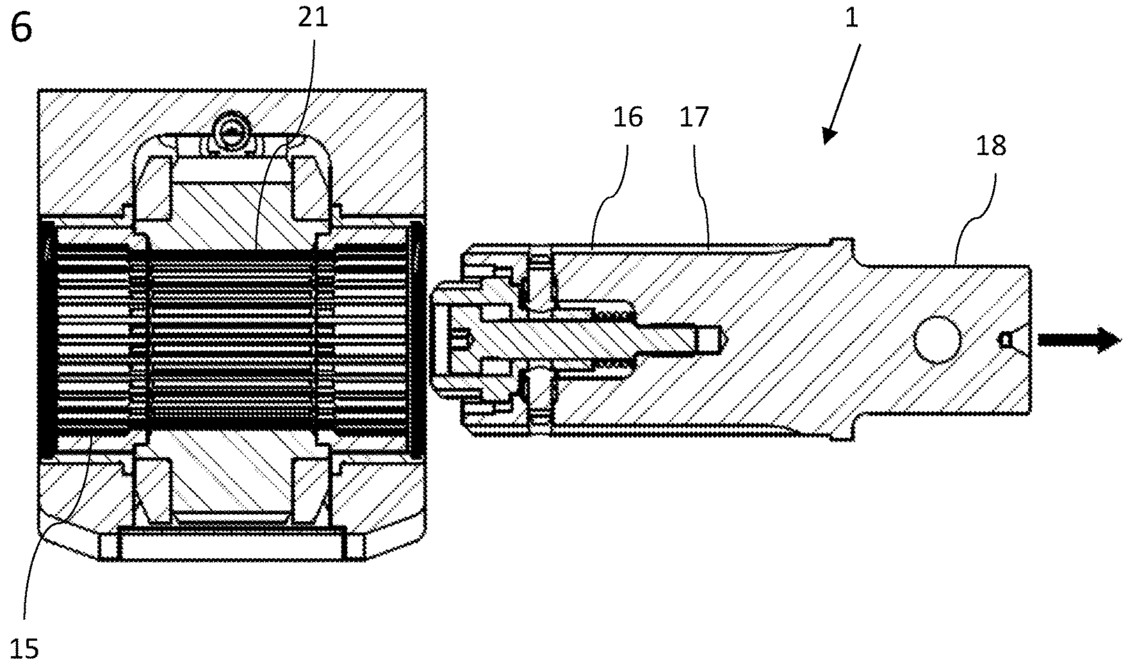

The drive member 1 can also be seen in more detail in FIG. 6 of the accompanying drawings, and comprises a first part 16 which is generally cylindrical and has an external splined surface 17 and which engages the drive connector 14 and a second part 18 which comprises the square (or other suitable shape) drive for driving the item to be rotated.

In order to retain the drive member 1 in the drive connector 14, a locking mechanism 19 is provided, which is integral with the drive member 1. The locking mechanism is provided in an internal bore 1A in the first part 16. Two radial pin bores 1B extend from the internal bore to the external splined surface 17, terminating in a groove between the ridges forming the splines.

In each of these pin bores 1B is a pin 2. The pins 2 each have a head 2A wider than the rest of the pin at the end of the pin at the internal bore 1A. A spring 3 works between a step in the pin bore 1B and the head 2A, and acts to bias the respective pin 2 into the internal bore 1A.

A button member 4 is also provided. This can (subject to what is written below) slide axially and rotate within the internal bore 1A. It is retained by retaining screw 5 working in a through bore 4A in the button member 4, and biased axially out of the internal bore 1A by spring 6.

The button member 4 has a cam part 4D of elliptical cross section. This is used to drive the pins 2 through the pin bores 1B. When the wider part of the ellipse (the major axis) is adjacent to the pins 2, the pins will be forced outwards against the force of the springs 3 and extend outwards from the external splined surface 17, whereas when the narrower part of the ellipse (the minor axis) is adjacent to the pins 2, the pins will retract in from the external splined surface 17 into the internal bore 1A due to the force of springs 3.

The button member also has radial holes 4C which house dowel pins 7 which act as protrusions. The dowel pins 7 work in grooves or slots 1D, 1E, comprising an axially extending groove 1D running along the internal bore parallel to the length of the internal bore 1A and which communicates with a circumferential groove 1E deeper into the internal bore 1A.

Figure 3:
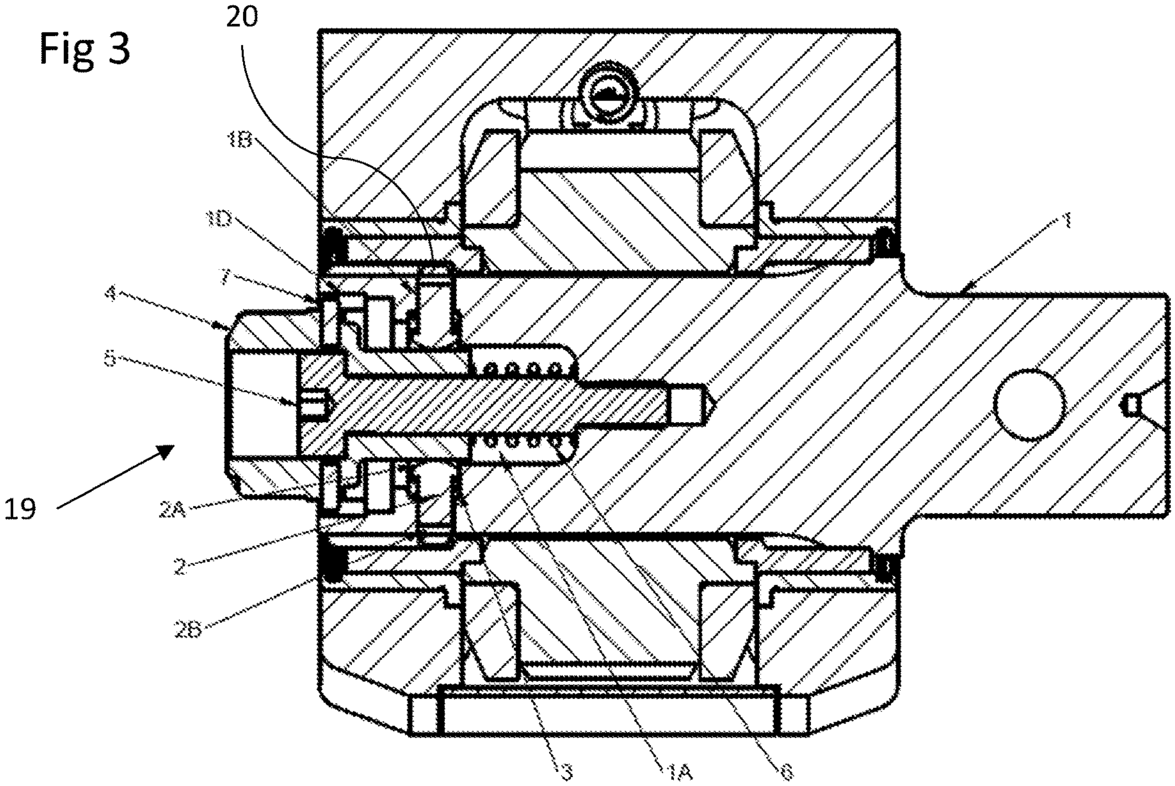
FIGS. 3 to 6 show cross sections along line A-A in FIG. 1, as the square drive of FIG. 1 is removed.

As such, when the pins 2 are extended out of the external splined surface 17 as shown in FIG. 3, the locking mechanism is in a first state, as the pins 2 will engage one of the ridges forming the splines of the internal splines 15. It will not be possible to remove the drive connector, or to rotate the button member because the dowel pins 7 are in the axially extending part of the groove 1D.

Figure 4:
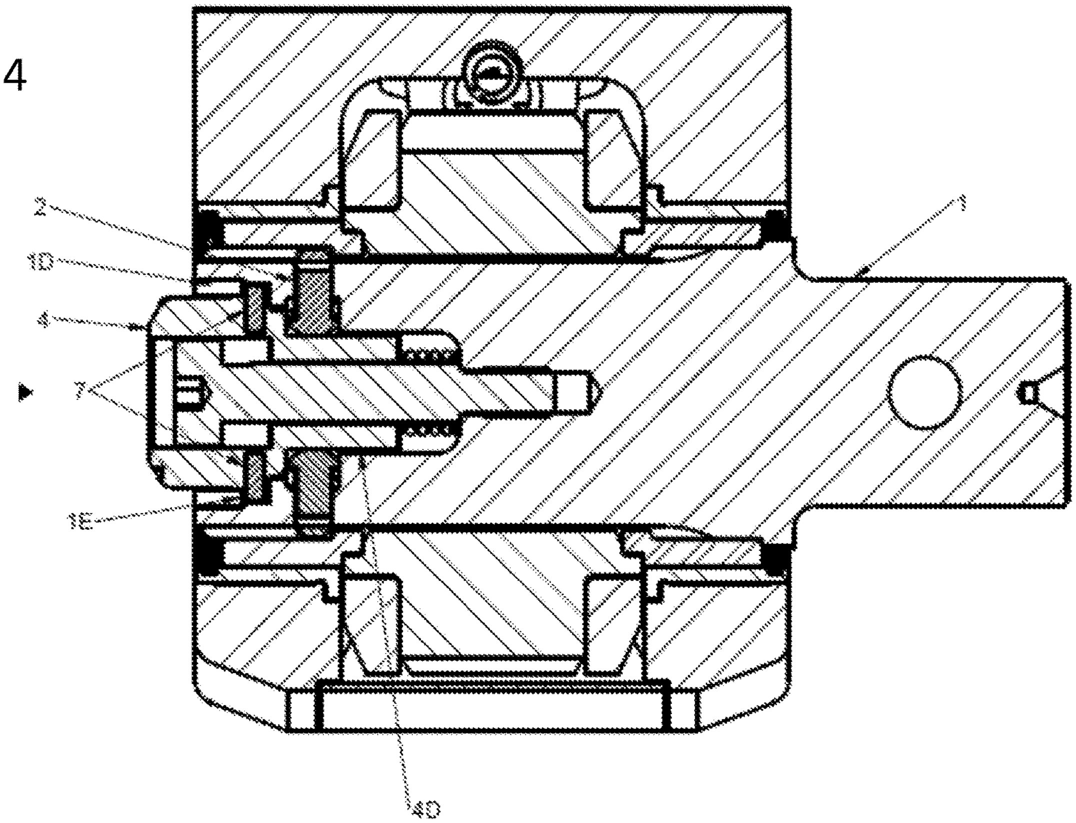

In order to remove the drive member 1 from the drive connector 14, the button member 4 is pressed against the force of spring member 6. The dowel pins 7 move down the axially extending part of groove 1D to the position shown in FIG. 4 of the accompanying drawings. As no rotation of the button member 4 has yet taken place (as it has not yet been allowed by the action of the dowel pins 7 in the axially extending part of groove 1D), the pins 2 are still forced outwards by the cam part 4D and still engage the splines 15.

However, the dowel pins 7 have now reached circumferential groove 1E. As such, it is now possible to rotate the button member 4. As the button member 4 is rotated, (shown in FIG. 5 of the accompanying drawings), the cam part 4D also rotates, allowing the pins 2 to retract from splines 15 due to springs 3.

Figure 5:
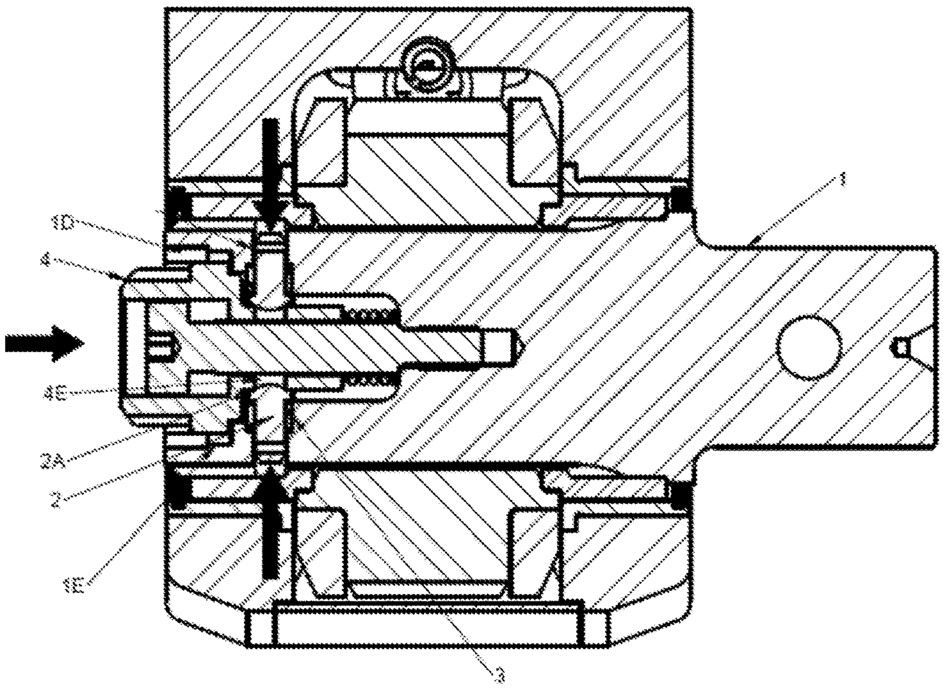

Thus, when the button member 4 has reached the position of FIG. 5, the pins 2 are fully retracted, and the locking mechanism 19 is in a second position. There are two holes or detents 4E in the cam part 4D which allow for a positive feedback to a user, as the pins 2 will "click" into the detents 4E in the second position.

As such, it will then be possible to remove the drive member 1 as shown in FIG. 6 of the accompanying drawings. It is worth noting that the drive connector 14 is symmetrical, so that the drive member 1 can be inserted and fixed from either end of the drive connector 14.

The pins 2 remain retracted in the pin bores 1B whilst in the second position, meaning that they are no impediment to reinserting the drive member 1 in the drive connector 14. The reverse procedure is then carried out as described above; the button member 4 is rotated around the circumferential groove 1E and then will "pop" out of the axially extending groove 1D due to the force of spring 6.

The pins 2 each have a small bore 2B perpendicular to their length, through which assembly pins can be passed whilst the drive member 1 is being assembled; effectively, these retain the pins 2 until the button member 4 is in the internal bore 1A.

The invention claimed is:

1. A hydraulic torque wrench, comprising:

an input for pressurized hydraulic fluid;

a drive connector;

a drive mechanism driven by hydraulic fluid introduced at the input and arranged to drive the drive connector to rotate;

a drive member for connecting to an item to be rotated by the hydraulic torque wrench, the drive member comprising a first part which engages the drive connector so as to be driven by the drive connector and a second part arranged to be coupled to the item to be rotated;

wherein:

the drive member comprises a retention mechanism which has two states: a first state in which the retention mechanism prevents removal of the drive member from the drive connector and a second state in which the retention mechanism permits removal of the drive member from the drive connector;

the retention mechanism remains connected to the drive member in the first state and in the second state;

the retention mechanism comprises at least one retractable pin in the drive member, the retractable pin extending from the drive member into the drive connector in the first state and retracting into the drive member in the second state;

the first part of the drive member has splines, and the drive connector has splines complementary to those of the first part of the drive member; and each pin protrudes from the splines of the drive member.

2. The hydraulic torque wrench of claim 1, in which the splines of the drive member and of the drive connector comprise ridges separated by grooves, each pin protrudes from the grooves of the drive member, so as to engage a ridge of the drive connector.

3. The hydraulic torque wrench of claim 1, wherein the first part of the drive member comprises an internal bore.

4. The hydraulic torque wrench of claim 3, wherein each pin works in a pin bore in the drive member in communication with the internal bore, such that more of each pin protrudes into the internal bore in the second state than in the first state.

5. The hydraulic torque wrench of claim 4, comprising a spring in each pin bore which tends to bias each pin into the second state.

6. The hydraulic torque wrench of claim 4, wherein the first part of the drive member comprises an eccentric cam member which can rotate in the internal bore coaxially with the internal bore and having a radius, the cam member having at least one wider part and at least one narrower part, with each wider part having a larger radius than each narrower part, and wherein in the first state one wider part engages each pin and forces the pin along the pin bore and in the second state a narrower part engages each pin.

7. The hydraulic torque wrench of claim 6, wherein the cam member is elliptical.

8. The hydraulic torque wrench of claim 6, wherein each narrower part is provided with a recess for a pin.

9. The hydraulic torque wrench of claim 3, wherein the first part of the drive member is provided with a locking mechanism, which will only allow a transition from the first state to the second state when unlocked.

10. The hydraulic torque wrench of claim 9, wherein the locking mechanism comprises a button member which can slide in the internal bore and which is fixed relative to the cam member.

11. The hydraulic torque wrench of claim 1, wherein the second part comprises a square, hexagonal or other drive for the item to be rotated.

12. A hydraulic torque wrench, comprising:

an input for pressurized hydraulic fluid;

a drive connector;

a drive mechanism driven by hydraulic fluid introduced at the input and arranged to drive the drive connector to rotate;

a drive member for connecting to an item to be rotated by the hydraulic torque wrench, the drive member comprising a first part which engages the drive connector so as to be driven by the drive connector and a second part arranged to be coupled to the item to be rotated;

wherein:

the drive member comprises a retention mechanism which has two states: a first state in which the retention mechanism prevents removal of the drive member from the drive connector and a second state in which the retention mechanism permits removal of the drive member from the drive connector;

the retention mechanism remains connected to the drive member in the first state and in the second state;

the retention mechanism comprises at least one retractable pin in the drive member, the retractable pin extending from the drive member into the drive connector in the first state and retracting into the drive member in the second state;

the first part of the drive member has splines, and the drive connector has splines complementary to those of the first part of the drive member;

each pin protrudes from the splines of the drive member;

the first part of the drive member comprises an internal bore;

the first part of the drive member is provided with a locking mechanism, which will only allow a transition from the first state to the second state when unlocked;

the locking mechanism comprises a button member which can slide in the internal bore and which is fixed relative to the cam member; and the button member is provided with at least one protrusion each of which works in two connected slots in the internal bore: an axial slot along a length of the internal bore, and a circumferential slot around the internal circumference of the internal bore.

13. The hydraulic torque wrench of claim 12, wherein the locking mechanism comprises a spring arranged to bias the button member axially away from each circumferential slot.

14. The hydraulic torque wrench of claim 12, in which the splines of the drive member and of the drive connector comprise ridges separated by grooves, each pin protrudes from the grooves of the drive member, so as to engage a ridge of the drive connector.

15. The hydraulic torque wrench of claim 12, wherein the second part comprises a square, hexagonal or other drive for the item to be rotated.

16. The hydraulic torque wrench of claim 12, wherein each pin works in a pin bore in the drive member in communication with the internal bore, such that more of each pin protrudes into the internal bore in the second state than in the first state.

17. The hydraulic torque wrench of claim 16, comprising a spring in each pin bore which tends to bias each pin into the second state.

18. The hydraulic torque wrench of claim 16, wherein the first part of the drive member comprises an eccentric cam member which can rotate in the internal bore coaxially with the internal bore and having a radius, the cam member having at least one wider part and at least one narrower part, with each wider part having a larger radius than each narrower part, and wherein in the first state one wider part engages each pin and forces the pin along the pin bore and in the second state a narrower part engages each pin.

19. The hydraulic torque wrench of claim 18, wherein the cam member is elliptical.

20. The hydraulic torque wrench of claim 18, wherein each narrower part is provided with a recess for a pin.

* * * * *